(12) United States Patent
Yoshimura et al.

(10) Patent No.: US 6,846,109 B2
(45) Date of Patent: Jan. 25, 2005

(54) SINTERED BEARING AND PRODUCTION METHOD THEREFOR

(75) Inventors: Noriyuki Yoshimura, Nagano (JP); Jun Hirose, Nagano (JP); Katsutoshi Nii, Hitachi (JP)

(73) Assignees: Minebea Co., Ltd. (JP); Hitachi Powdered Metals, Co., Ltd. (JP)

( * ) Notice: Subject to any disclaimer, the term of this patent is extended or adjusted under 35 U.S.C. 154(b) by 82 days.

(21) Appl. No.: 10/392,297

(22) Filed: Mar. 18, 2003

(65) Prior Publication Data

US 2004/0013328 A1 Jan. 22, 2004

(30) Foreign Application Priority Data

Mar. 18, 2002 (JP) ........................................ 2002-074506

(51) Int. Cl.[7] ...................... F16C 33/12; B21D 53/10
(52) U.S. Cl. ..................... 384/279; 384/100; 384/902; 29/898.02
(58) Field of Search ................................. 384/100, 279, 384/902, 297, 299, 300; 419/10, 26; 29/898.02, 898.054

(56) References Cited

U.S. PATENT DOCUMENTS

| | | | | |
|---|---|---|---|---|
| 2,691,814 A | * | 10/1954 | William ...................... | 428/545 |
| 4,582,368 A | * | 4/1986 | Fujita et al. .................. | 384/13 |
| 5,762,423 A | * | 6/1998 | Mori et al. .................. | 384/279 |
| 6,669,371 B2 | * | 12/2003 | Tanaka et al. .............. | 384/279 |
| 2002/0060828 A1 | * | 5/2002 | Ishuzika et al. ............ | 359/200 |

FOREIGN PATENT DOCUMENTS

JP     H11-13765     1/1999

* cited by examiner

Primary Examiner—Thomas R. Hannon
(74) Attorney, Agent, or Firm—Brinks Hofer Gilson Lione

(57) ABSTRACT

A production method for a sintered bearing, comprises compacting a raw metallic material powder into a bearing green compact; sintering the green compact into a sintered compact; and forming a resin coating over the entire surface of the sintered compact by electrodeposition.

8 Claims, 2 Drawing Sheets

SINTERED BEARING AND PRODUCTION METHOD THEREFOR

BACKGROUND OF THE INVENTION

1. Field of the Invention

The present invention relates to sintered bearings and production methods therefor used in sustaining various rotational products and bearings for motors, for example, information devices, office equipment, electrical appliances, construction equipment, and the like.

2. Related Art

Sintered bearings produced according to a powdered metal sintering technique have been widely used for the above applications since they are easy and inexpensive to mass-produce, and in particular, because of their dimensional stability. Sintered bearings are roughly produced by compacting a metallic raw metallic powder into a bearing green compact, sintering the green compact into a sintered compact, then subjecting the sintered compact to a sizing process to finish into predetermined dimensions and shape.

Sintered bearings are commonly used as oil retaining sintered bearing in which lubricating oil is impregnated in pores therein for lubrication and dynamic pressure property. As lubricating oil retaining sintered bearings for accurate rotating and high speed rotating motors used in, for example, spindle motors for HDDs (hard disk drives), there have been provided bearings in which grooves for generating dynamic pressure are formed on an inner peripheral surface of the bearing. The dynamic pressure is generated by increase in the pressure of an oil film formed between a rotating shaft and the inner peripheral surface of the bearing, and this realizes sustaining of the rotating shaft at high rotational accuracy and bearing stiffness.

The lubricating oil impregnated bearings are not suitable for some kinds of products. That is the lubricating oil retaining sintered bearings sometimes exude the oil and contaminate the surroundings, and the bearings are not easy to use in portions required to usually be cleaned, such as hinges of covers in notebook-type personal computers and mobile telephones.

When lubricating oil retaining sintered bearings are used for guide bushes in construction equipments such as power shovels, the bearings are exposed to sand and water introduced therein. Therefore, bearings are, for example, sealed in cases to form waterproof means so as to extend the service life and to improve reliability. However, the waterproof means require complicated structures, and maintenance is not easy since the case must be opened when the lubricant must be resupplied. Moreover, when washing solvent is caught and retained in pores of sintered bearings during and after washing process, noxious gases are generated when increase of temperature in use.

Dry-type sintered bearings in which a solid lubricant such as molybdenum disulfide is dispersed in a metallic powder to obtain a solid lubricate may be used for products in which lubricating oil cannot be used. However, dry-type sintered bearings are corroded in high temperature and high moisture environments. Corrosion in the dry-type sintered bearing results in shortening of the service life in addition to wear and noise, and means for improving corrosion resistance have therefore been required.

Thus, conventional sintered bearings involve various problems such as leakage of lubricating oil, complicated structure for waterproof means, generating noxious gases, and poor corrosion resistance. In order to solve these problems, it may be proposed that the entire surface of a sintered bearing is coated by a resin. Specifically, the bearing is dipped into a resin solvent or the surface thereof is sprayed with a resin to form a resin coating thereover.

In the above proposed means, the resin coating over the surface of the bearing can avoid leakage of lubricating oil, generating noxious gases, and penetration of water, and can ensure corrosion resistance since the bearing is not exposed to ambient imbruement. However, such as the inner peripheral surface of the bearings are required to have high dimensional accuracy, and the above resin coating coverage is not suitable for accurate dimensions. That is, there are several difficulties in the resin coating process, in controlling and ensuring uniformity of coating thickness, such as these difficulties that resin coating cannot be formed in complicated bearing shape, and an extremely thin resin coating cannot be formed. Therefore, dimensional stability which is an advantage of sintered bearings, is deteriorated, in particular, the bearings are not suitable for small parts. Furthermore, the resin is difficult to enter into the small pores on the surface of the bearing, and the securing strength of the resin is low and the resin coating is stripped easily.

BRIEF SUMMARY OF THE INVENTION

Therefore, an object of the present invention is to provide a sintered bearing and production method therefor capable of facilitating controlling and ensuring uniformity of the coating thickness, and capable of forming an extremely thin coating while obtaining high securing strength of the resin coating.

The present invention provides a production method for a sintered bearing, the method comprising: compacting a raw metallic material powder into a bearing green compact; sintering the green compact into a sintered compact; and forming a resin coating over the entire surface of the sintered compact by electrodeposition.

The electrodeposition of the present invention may be performed by a typical known method. That is, an electrode and a sintered compact separated from each other are dipped into an electrolyte mixed with a resin, and a DC voltage is applied between both for predetermined time. By the interaction of the applied voltage, the resin in the electrolyte electrophoretically moves toward the sintered compact and adheres there to form a resin coating. A cathode is used for the electrode dipped in the electrolyte when an anionic electrodeposition is applied, and an anode is used for the electrode when a cationic electrodeposition is applied, but the later method is popular in recent years. The sintered compact after forming a resin coating is baked in a baking and drying furnace, and the resin coating is cured on the surface of the sintered compact. These treatments are the electrodeposition process.

As the resin, PTFE (polytetrafluoroethylene) with lubrication, nylon, PEEK (polyetheretherketone) with heat proof and wear resistance, polymide, epoxy, and the like are preferable.

The sintered bearing produced by the invention is thus coated by the resin coating over the entire surface thereof, and is therefore capable of avoiding release of noxious gases and penetration of water, and is capable of maintaining corrosion resistance since it is not exposed to air. Typical sintered bearings lubricate with lubricating oil retained in the pores. In contrast, the bearing in the invention has lubrication by the resin coating formed by the electrodeposition instead of the lubricate, whereby fitting performance between the bearing and a rotating shaft, wear resistance, corrosion resistance, and cleanliness can be obtained.

In the invention, thickness of the resin coating can be easily controlled and made uniform since the electrodeposition is applied. The thickness of the resin coating is easily controlled by controlling the voltage applied in the electrodeposition, application time, temperature of the electrolyte, and the like. The thickness of the resin coating is uniform according to the characteristics of the electrodeposition, and bearings having suitable coating thickness according to the equipment employed are therefore produced. Furthermore, the coating thickness can be extremely thin, so that dimensional stability originally provided in sintered bearings is maintained, and the bearings can be applied to small parts, and additionally, the method can easily applied to mass-production.

In the method of the invention, pores are reliably sealed since the electrophoretic resin penetrates into the small pores on the surface of the bearing in the electrodeposition, so that the resin penetrated into the pores functions as an anchor, and the resin is rigidly secured to the surface to avoid from being stripped therefrom. Furthermore, the bearing is employed as an electrode, and a uniform resin coating is easily formed even for bearings having complicated shape. It should be noted that the thickness of the resin coating is set so as to obtain the above mentioned advantages. In particular, the thickness is preferably 5 $\mu$m or more to uniformly coat the entire surface of the bearing, and the thickness is preferably 100 $\mu$m or less, and is more preferably 50 $\mu$m or less, to ensure wear resistance, and the like.

In the production method of the invention, the raw metallic material powder is mixed with a magnetic powder, and a resultant bearing from the sintered compact is magnetized after the electrodeposition. Overall, the bearing produced in this manner is employed as a magnet since the magnetic powder is magnetized. When a magnetic fluid is used as a fluid, the magnetic fluid is usually held between the sintered bearing and a rotating shaft by the magnetic force of the bearing, and stable dynamic pressure properties are therefore obtained and leakage thereof is restrained.

In bearings including a magnetic powder, fitting performance with a rotating shaft is not sufficient and wear may easily occur since comparatively hard magnetic powder is exposed on the surface of the bearing. The magnetic powder exposed on the surface may be broken or scattered by abrasion, and the loosened particles function as an abrasive between the rotating shaft and the bearing. As a result, wear is promoted and vibration characteristics are not stable, and accurate rotation is not obtained. In contrast, the bearing produced by the production method of the invention is formed with the resin coating over the entire surface thereof, whereby the resin coating lubricates the bearing surface, and the fitting performance with the rotating shaft is improved in spite of dispersion of the magnetic powder. Furthermore, the resin coating restrains breakage and scattering of the magnetic powder. As a result, wear due to the magnetic powder existing between the inner peripheral surface of the bearing and the rotating shaft is restrained, and vibration performance is therefore stable, and highly accurate rotation is obtained.

In the production method of the invention, grooves for generating dynamic pressure may be formed on an inner peripheral of the bearing. The grooves may be formed, for example, in a sizing process in which the bearing hole is finished to the predetermined dimension. In this production method, the bearing surface is covered by the resin coating and the pores on the surface are sealed, whereby the dynamic pressure generated by the fluid supplied into the grooves does not penetrate, and highly accurate rotation and high stiffness are ensured. Furthermore, the entire surface of the bearing is covered by the resin coating, so that noxious gases are not generated from the inside of the bearing if the temperature of the bearing increases. Therefore, gas generated from pores, which has been a concern on conventional bearings, is avoided. In addition, in the bearing in which a magnetic powder is mixed therein, breakage and scattering of the magnetic powder are avoided in forming the grooves for generating dynamic pressure, and the grooves can be easily worked and the shape of the grooves and dimensional accuracy of the inner peripheral surface of the bearing are improved.

DESCRIPTION OF THE PREFERRED EMBODIMENTS

An embodiment of the invention will be explained with reference to the drawings hereinafter.

Figure 1:
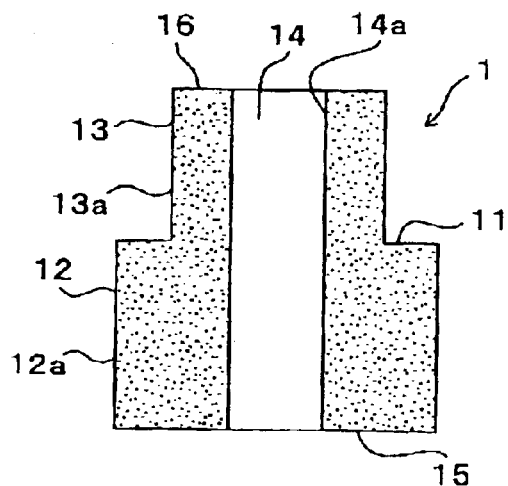
FIG. 1 is a vertical cross-sectional view of a sintered bearing produced by an embodiment of the invention.
Figure 2:
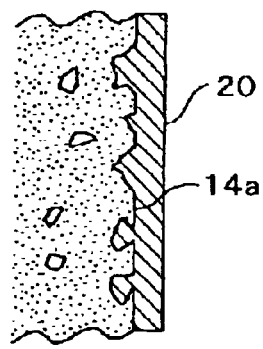
FIG. 2 is an enlarged cross-sectional view of a surface layer of the bearing produced by the embodiment of the invention.

FIG. 1 shows a cylindrical sintered bearing produced by the production method of the invention. The sintered bearing 1 is formed with an annular stepped portion 11 consisting of a planar surface along the radial direction, and the stepped portion 11 divides the outer surface of the bearing 1 into a large diameter portion 12 and a small diameter portion 13. The bearing 1 has a bearing hole 14 at its center, into which a rotating shaft (not shown) is inserted, has a uniform diameter, and the inner surface of the bearing hole 14 is employed as a bearing surface. The entire surface of the bearing 1, that is, the outer peripheral surfaces 12a and 13a of the large diameter portion 12 and the small diameter portion 13, bearing surface 14a, and end surfaces 15 and 16 of the large and small diameter portions 12 and 13, and end surface of the stepped portion 11, are covered by a resin coating 20 having a uniform thickness, as shown in FIG. 2. FIG. 2 shows the surface layer of the bearing surface 14a. The thickness of the resin coating 20 is set according to required specifications. A production method for producing the bearing 1 will be explained hereinafter.

1. Sintering Process

An alloy raw material powder having a predetermined chemical composition such as an Fe—Cu type alloy powder mainly consisting of Fe and Cu for a bearing is compacted into a green compact having a shape similar to that shown in FIG. 1. Then, the green compact is sintered into a sintered bearing compact at a suitable temperature and time.

2. Electrodeposition Process

A resin for forming a resin coating is dispersed in an electrolyte charged into an electrodeposition vessel at a predetermined proportion to prepare a coating medium, and the coating medium is agitated and maintained at a predetermined temperature. An electrode and the bearing compact separated from each other are dipped into the coating medium, and a dc voltage is applied between both for predetermined time. By the interaction of the applied voltage, the resin particles having a charge in the electrolyte electrophoretically move toward the bearing compact, and adhere there to form a resin coating. The bearing compact after forming a resin coating is baked in a baking and drying furnace, and the resin coating is cured on the surface of the bearing compact. These treatments are the electrodeposition process, in which a sintered bearing formed with a resin coating over the entire surface thereof is thus produced.

3. Sizing Process

The sintered bearing formed with the resin coating is subjected to a sizing step if necessary, in which the bearing is compacted again, and the axial length, outer diameter, and inner diameter are finished to a designed dimension.

The sintered bearing obtained through the above processes is coated by the resin coating over the entire surface thereof, and is therefore capable of avoiding release of noxious gases in the sintering process and penetration of water, and is capable of maintaining corrosion resistance since it is not exposed to air.

Figure 3:
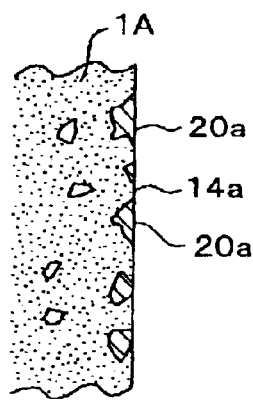
FIG. 3 is a cross-sectional view showing an inner peripheral surface of a sintered bearing which is used over a long period.

It is assumed that the resin coating on the inner surface of the bearing will be worn or stripped through sliding with a rotating shaft over a long period, and the matrix 1A of the bearing 1 will be exposed on the inner surface. In this case, as shown in FIG. 3, the resin 20a in pores exposed on the bearing surface 14a is maintained, and the resin will lubricate the rotating shaft. Furthermore, corrosion resistance is maintained since a lubricant is supplied to the bearing surface 14a, although the matrix 1A is exposed. Although the lubricant may penetrate into pores inside from the exposed matrix 1A, the lubricant will not leak from the outer peripheral surfaces 12a and 13a and the end surfaces 11, 15, and 16 since these surfaces are sealed by the resin coating 20.

In the invention, the thickness of the resin coating can be easily controlled and made uniform since the resin coating is formed over the entire surface of the bearing 1 by electrodeposition. The thickness of the resin coating is easily controlled by controlling the voltage applied in the electrodeposition, applying time, temperature of the electrolyte, and the like. The thickness of the resin coating is uniform according to the characteristics of the electrodeposition, and bearings having suitable coating thickness according to equipment employed are therefore produced. Furthermore, the coating thickness can be extremely thin, so that dimensional stability originally provided in sintered bearings is maintained, and the bearings can be applied to precision parts. In addition, pores are reliably sealed since the electrophoretic resin penetrates into the small pores on the surface of the bearing in the electrodeposition, so that the pores are sufficiently sealed and the penetrated resin into the pores functions as an anchor, and the resin is rigidly secured to the surface to avoid from being stripped therefrom.

Modifications of the above embodiment will be explained hereinafter.

A magnetic powder is mixed into an alloy raw powder, and the mixed powder is subjected to the above processes 1 to 3 to produce a sintered bearing. Then, the resultant sintered bearing is magnetized by a magnetizing apparatus.

In the sintered bearing obtained by the above process, overall, the bearing is employed as a magnet since the magnetic powder is magnetized. When a magnetic fluid is used as a fluid, the magnetic fluid is usually held at the sliding portion between the sintered bearing and a rotating shaft by the magnetic force of the bearing. That is, sealing properties act for the magnetic fluid. The resin coating is formed over the entire surface of the bearing, whereby lubricating properties by the resin coating are obtained and fitting performance with a rotating shaft is extremely improved in spite of dispersion of the magnetic powder. Furthermore, the resin coating restrains breakage and loosing of the magnetic powder, and wear due to the magnetic powder is therefore restrained. As a result, vibration performance is stable and highly precise rotation is obtained.

Figure 4:
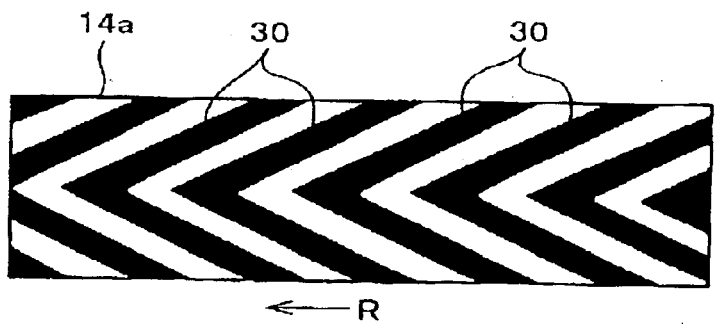
FIG. 4 is an expanded view of the inner peripheral surface of the bearing formed with dynamic pressure generating grooves.

In another modification, grooves for generating radial dynamic pressure are finally formed on a bearing surface of the bearing. The grooves may be formed in the sizing process. Several types of grooves are applied to the invention. For example, as shown in FIG. 4, herringbone grooves 30 comprised of multiple V-shaped grooves are mentioned. The herringbone grooves 30 are formed parallel to each other at equal intervals and the apex of each groove points towards the rotational direction R of a rotating shaft.

In this modification with the dynamic pressure generating grooves 30, the bearing surface is covered by the resin coating and the pores on the surface are sealed, whereby the dynamic pressure generated by the fluid supplied into the grooves 30 does not leak, and highly precise rotation and high rigidity are ensured. Furthermore, in the bearing in which a magnetic powder is mixed therein, breakage and loosing of the magnetic powder are avoided in forming the grooves for generating dynamic pressure, and the grooves can be easily worked and the shape of the grooves and dimensional accuracy of the bearing hole are improved.

Figure 5:
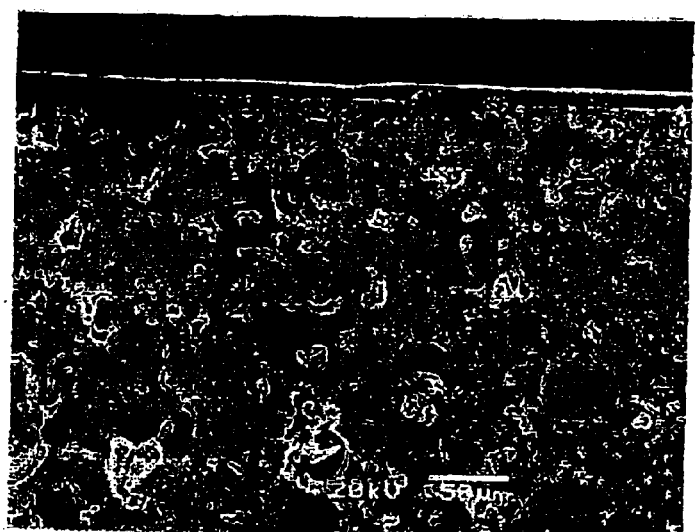
FIG. 5 is a SEM photograph showing a surface layer at the outer surface side of the bearing.
Figure 6:
FIG. 6 is a SEM photograph showing a surface layer at the inner surface side of the bearing.

FIGS. 5 and 6 are SEM photographs showing surface layers of sintered bearings produced by the above embodiment. The thicknesses of the resin coating at the outer surfaces of the large and small diameter portions and end surface and inner surface of the large diameter portion were measured from the SEM photograph, and it was confirmed that a resin coating with uniform thickness of from 50 to 60 μm was formed on the outer surface layer (FIG. 5) and on the inner surface layer (FIG. 6). In addition, it was confirmed that pores on the bearing surface were closely filled with the resin and that the resin coating was rigidly secured to the surface by the anchoring function of the pores.

What is claimed is:

1. A production method for a sintered bearing, the method comprising:

compacting a metallic raw material powder into a bearing green compact;

sintering the green compact into a sintered compact; and forming a resin coating over the entire surface of the sintered compact by electrodeposition.

2. The production method for a sintered bearing according to claim 1, wherein, the raw metallic material powder is mixed with a magnetic powder, and a resultant bearing from the sintered compact is magnetized after the electrodeposition.

3. The production method for a sintered bearing according to claim 1, wherein, grooves for generating dynamic pressure are formed on an inner peripheral surface of the bearing.

4. The production method for a sintered bearing according to claim 1, wherein pores exposed at least on an inner peripheral surface of the sintered bearing are covered with the resin.

5. A sintered bearing comprising:
- a bearing body made of a sintered alloy and having an inner peripheral surface of the bearing; and
- a resin coating provided over the entire surface of the bearing body by electrodeposition.

6. The sintered bearing according to claim 5, wherein pores on at least the inner peripheral surface of the bearing surface are covered with the resin.

7. The sintered bearing according to claim 5, wherein a magnetic powder is dispersed therein.

8. The sintered bearing according to claim 5, wherein grooves for generating dynamic pressure are formed on the bearing surface.

* * * * *